United States Patent [19]

Ando

[11] 4,456,186
[45] Jun. 26, 1984

[54] ELECTRICALLY HEATED REACTOR FOR HIGH TEMPERATURE AND PRESSURE CHEMICAL REACTIONS

[75] Inventor: Masao Ando, Yokohamashi, Japan

[73] Assignee: Chisso Engineering Co. Ltd., Tokyo, Japan

[21] Appl. No.: 241,942

[22] Filed: Mar. 9, 1981

[51] Int. Cl.³ .......................... C21D 1/00; H05B 3/00
[52] U.S. Cl. .................................. 219/300; 137/341; 219/301; 219/316; 422/174; 422/199
[58] Field of Search ................... 219/300, 301, 316; 422/199, 174; 137/341

[56] References Cited

U.S. PATENT DOCUMENTS

| | | | |
|---|---|---|---|
| 2,729,734 | 1/1956 | Decker | 219/300 |
| 3,293,407 | 12/1966 | Ando | 219/301 |
| 3,629,551 | 12/1971 | Ando | 219/300 |
| 3,777,117 | 12/1973 | Othmer | 219/301 X |

FOREIGN PATENT DOCUMENTS

| | | | |
|---|---|---|---|
| 15150 | 3/1980 | European Pat. Off. | 219/301 |
| 48-34085 | 10/1973 | Japan | 219/300 |

Primary Examiner—A. Bartis
Attorney, Agent, or Firm—Fred Philpitt

[57] ABSTRACT

An electrically heated reactor for high temperature and pressure chemical reactions includes a reactor vessel having an inlet opening for introduction of raw material onto the reactor and an outlet opening for removal of heated material from the reactor. An electric heating assembly extends through the inlet opening into the interior of the vessel and includes a metallic inner tube through which raw material can be introduced into the vessel and an outer ferromagnetic tube arranged in spaced concentric relationship with respect to the inner tube and generally coextensive in length therewith. The innermost ends of the tubes are electrically connected to each other by a metallic member which seals the space between the tubes. An electrical insulating medium is disposed within the space. A variable frequency alternating current source is connected between the inner and outer tubes outside of the vessel and the outer tube is in direct contact with and is welded to the wall of the vessel at the inlet opening to form a seal therebetween. The outer tube has a thickness greater than the penetration depth of the alternating current. The inner tube may be ferromagnetic and have a thickness like that of the outer tube.

5 Claims, 4 Drawing Figures

ELECTRICALLY HEATED REACTOR FOR HIGH TEMPERATURE AND PRESSURE CHEMICAL REACTIONS

BACKGROUND OF THE INVENTION

1. Field of the Invention

This invention relates to an electrically-heating reactor for high temperature and high pressure chemical reactions.

2. Description of the Prior Art

Among the electrically heating systems for reactors used at higher temperature, under higher pressure, there have been heretofore two kinds of heating system i.e. (a) an indirect heating system which relies on a so-called sheath wire heat-generating element (or a MI cable) formed by using a resistor such as a Nichrome wire and an electric insulating material such as magnesia filled between a protecting sheath and a resistor; and (b) a direct heating system in which a heat-generating element is installed in the exposed state in a reactor and the heating element and a material to be heated (the content of the reactor also including reacted material) are arranged to be in direct contact. However, in the indirect heating system (a) there is a weakness in terminal parts in case of high temperature and high pressure as is well-known in the art and in the direct heating system (b) the insulation between a reactor body and terminal parts of the heat-generating element is liable to cause a short circuit by scale of the like (particularly at higher temperature and under higher pressure). Further in the case where a material to be heated is conductive, there is a fear that an undesirable short circuit will occur through the material to be heated from a heat-generating element to the inner wall of a reactor, and the insulation between a reactor and terminal parts becomes difficult.

It is an object of the present invention to provide an electrically-heating apparatus for reaction in which the above-mentioned drawbacks have been overcome.

SUMMARY OF THE INVENTION

The present invention resides in an electrically heating reaction apparatus in which clearance is provided or an electric-insulating material is filled between an electrically conductive inner tube and an electrically conductive outer tube for mutual insulation thereof, one end of the inner tube being electrically connected with one end of the outer tube inside the reactor. The remaining ends of the inner and outer tubes are provided with respective terminals, both of which are positioned outside the reactor in such an arrangement that the inner and outer tubes form an electric circuit for an alternating voltage when it is applied thereacross. The inner tube is arranged to be used as a feeding route for reaction raw material to the reactor and the generated heat of the inner tube is used to heat the reaction raw material and the generated heat of the outer tube is used to heat the reactor content around the outer tube.

The inner and outer tubes can be of various shapes such as zigzag shape, spiral shape, etc. The reactor can also be of various shapes, such as cylindrical shape, tank shape, tower shape, etc.

The apparatus of the present invention has a characteristic feature in that it is possible to have an arrangement in which there is no leakage of current to a reactor nor short circuiting by the reactor even when an outer tube is contacted with or welded to the vessel wall in the penetrating part. The reactor parts of the outer tube are electrically shorted with the reactor wall because only the outer tube faces the penetrating part of the reactor wall among the inner and the outer tubes which comprise a conductive element penetrating the reactor wall and returning from the inside to the outside of the reactor.

In accordance with the aforementioned arrangement, the outer tube is made of ferromagnetic conductive material and the thickness of the tube is selected to be greater than the skin depth of alternating current hereinafter described and, preferably greater than twice the skin depth. With such an arrangement, there will actually be no outflow of electricity from the outer tube to the reactor content even when the reactor content is conductive. In this case, if the raw material fed to the reactor through the inner tube is non-conductive (e.g. gas), there is no need for the use of ferromagnetic material for the inner tube and no need for making its thickness greater than the skin depth of alternating current.

However, if the inner tube is made of ferromagnetic conductive material and the thickness of the inner tube is selected to be greater than the skin depth of the alternating current, preferably greater than twice the skin depth, there will actually be no outflow of electricity from the inner tube to the raw material even when the raw material fed to the reactor through the inner tube is of conductive material.

The heat generated by the inner tube is used mainly for heating the raw material passing therethrough and the heat generated by the outer tube is used mainly for heating the reactor content around the outer tube. The word "mainly" is used herein from the consideration that there is heat transmission when a temperature difference between the inner and the outer tube is present. Further in such cases as those in which the preheating amount for raw material hydrogen is far greater than the heating amounts for a reactor content for liquefaction of coal, i.e. a coal solution or slurry, it is possible to alter the material for the inner and the outer tubes or alter the thicknesses in order to set the heat generating amounts of the inner and the outer tubes as well as the ratio of the above-mentioned amounts at desired values, respectively. When it is required to change the ratio of the heat-generating amount of the inner and the outer tubes, such a requirement can be satisfied by changing the frequency of an electric source.

BRIEF DESCRIPTION OF THE SEVERAL VIEWS OF THE DRAWING

The present invention will be further illustrated by referring to the drawings.

DETAILED DESCRIPTION OF THE PREFERRED EMBODIMENTS

Figure 1:
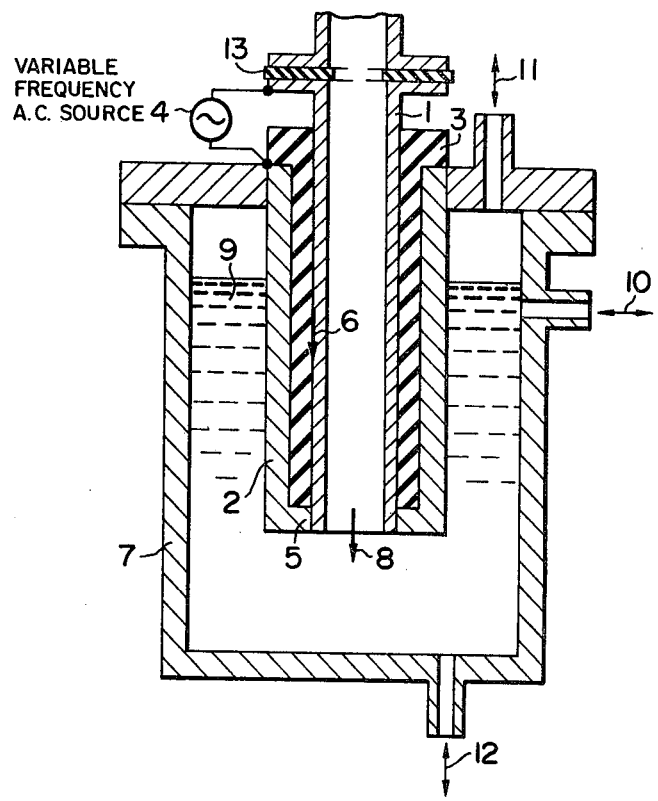
FIG. 1 shows a schematic vertical cross-section of the reaction apparatus of the present invention for carrying out high temperature, high pressure reactions.

In FIG. 1, 1 is an inner tube which is used as a feeding route for reaction raw material represented by arrow 8, 2 is an outer tube, 3 is a clearance or an insulator for electrically insulating the inner and outer tubes from each other and 4 is an alternating current source which may be one, the frequency of which is variable.

If the inner and outer tubes 1 and 2 are connected electrically at one end 5 and so constructed that the pressure inside the reactor 7 is kept sealed relative to the atmosphere, it is possible to install an insulator 3 independently of the inside pressure of the reactor 7 though the insulator 3 must be resistant to high temperature.

It is possible to provide the outlet and inlet for the product from the reactor 7 and reaction raw materials at 10, 11, 12 and the like. 13 is an insulating flange for insulating the circuit consisting of the inner and outer tubes and the electric source 4 from other parts.

In such an apparatus as above-mentioned the inner and the outer tubes form a circuit with an electric source 4 and a current respresented by arrow 6 will flow. Let the current 6 be i, and the resistances of the inner and the outer material which are determined by the electric and ferromagnetic properties of the materials of the inner and the outer tubes be $\gamma_1$ and $\gamma_2$, respectively [refer to formulae (8) and (9)], then the heat-generating amount $W_1$ of the inner tube (mainly the heating amount directed to fluid reaction raw material) will be $$W_1 = i^2 \gamma_1 \quad (1)$$

and the heat-generating amount $W_2$ of the outer tube (mainly the heating amount directed to the reactor content) will be $$W_2 = i^2 \gamma_2 \quad (2)$$

If a case of coal liquefication is used as an example of reaction (in this case, 9 includes a solution or slurry or coal) and hydrogen gas is supplied from the inner tube 1, it is preferable to make the relation of $W_1$ and $W_2$ as follows.

$$W_1 >> W_2 \quad (3)$$

However, there will also be an opposite case depending upon the kinds of reactions, but in the case of formula (3), there will be a necessity for making the relation of $\gamma_1$ and $\gamma_2$ as follows.

$$\gamma_1 >> \gamma_2 \quad (4)$$

There will be various conditions for establishing the relationship of the formula (4) but it will be one measure to select the materials of the inner and the outer tube so as to give different values in electrical and ferromagnetic properties such as resistivity $\rho_1$ and $\rho_2$ and relative magnetic permeability $\mu_1$ and $\mu_2$ though the lengths of the inner and the outer tubes, i.e. the lengths of the route of electric current, are approximately the same and cannot be differentiated practically in the heat-generating element of the present invention.

In order to establish the relationship of the formula (4) it is also another measure to select the thickness of the inner tube $t_1$ and that of the outer tube $t_2$ so as to satisfy the relationship of $$t_2 > t_1 \quad (5)$$

However, it is necessary to note that the thickness depends also upon the pressure of the reactor.

Further, since the heating element of the present invention is used relative to an alternating current source, when the thicknesses of the inner and the outer tubes are great compared with the skin depth of alternating current, it is necessary to take this fact into consideration. If it is assumed that the frequency of an alternating current source is f (HZ), the thicknesses of the inner and the outer tube is $t_1$ and the $t_2$ (cm), respectively, and resistivities of these materials is $\rho_1$ and $\rho_2$ ($\Omega$cm), respectively, and the relative magnetic permeabilities is $\mu_1$ and $\mu_2$, respectively, then the depths $S_1$ and $S_2$ (cm) of alternating currents passing through the skins of said inner and outer tubes take the following values.

$$S_1 = 5030 \sqrt{\frac{\rho_1}{\mu_1 f}} \text{ and } S_2 = 5030 \sqrt{\frac{\rho_2}{\mu_2 f}} \quad (6)$$

Accordingly, if the relationship of $t_1 >> S_1$, and $t_2 >> S_2$ are held, $\gamma_1$ and $\gamma_2$ can be expressed independently of $t_1$ and $t_2$, respectively by the following relationships.

$$\gamma_1 = \frac{\rho_1 l_1}{\pi d_1 s_1} = \frac{\sqrt{\rho_1 \mu_1 f}}{5030 \pi d_1} \cdot l_1 \quad (8)$$

$$\gamma_2 = \frac{\rho_2 l_2}{\pi d_2 s_2} = \frac{\sqrt{\rho_2 \mu_2 f}}{5030 \pi d_2} \cdot l_2 \quad (9)$$

wherein $l_1$ and $l_2$ (cm) are the lengths of the inner tube and the outer tube, respectively, both of which are nearly equal, $d_1$ (cm) is the outer diameter of the inner tube, and $d_2$ (cm) is the inner diameter of the outer tube. In this case, concentrated alternating current flows in the range of the depth of $S_1$ close to the outer skin in the inner tube and in the range of the depth of $S_2$ close to the inner skin in the outer tube.

Further if construction is made to give the relationship $$t_1 << S_1 \text{ and } t_2 >> S_2 \quad (10)$$

then $\gamma_2$ is influenced by the frequency of the alternating current but $\gamma_1$ will become almost independent of f.

Accordingly, if the frequency of the electric source is variable, it is possible to alter the ratio of heat generations $W_1$ and $W_2$ of the inner and the outer tubes, and even when material 9 to be heated has conductivity, there is no danger of leakage of current to this material 9. If fluid 8 to be heated is gas, it has no conductivity, and therefore, there is no leakage of current even under the condition of the formula (10). The relation opposite to the formula (10) is also possible.

Figure 2:
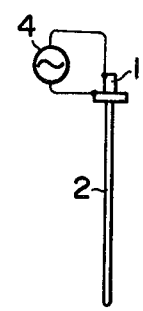
FIG. 2 shows a linear shape of the heat-generating element.
Figure 3:
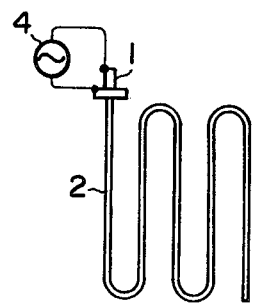
FIG. 3 shows a serpentine shape of the heat-generating element.
Figure 4:
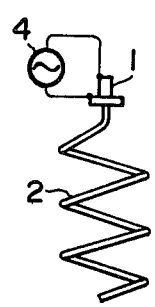
FIG. 4 shows a spiral shape of the heat-generating element.

FIGS. 2 to 4 show schematically several examples of the shape of heat-generating elements (the inner and the outer tubes) of the apparatus of the present invention. FIG. 2 shows straight line form, FIG. 3 shows zigzag form and FIG. 4 shows spiral form.

The apparatus of the present invention can be applied advantageously to coal liquefication as above-mentioned. In this case it is preferable that a solution or a slurry of coal is fed to or formed in a reactor 7 and hydrogen gas is heated by the inner tube and fed at a high temperature.

According to the apparatus of the present invention, a heat-generating element is of extremely simple structure and has no weak point unlike the case of MI cable referred to hereinbefore. It is possible to arbitrarily select the ratio of the heating amount $W_1$ directed mainly to reaction raw material to the heating amount $W_2$ directed mainly to reactor content and moreover even during the course of operation the ratio of $W_1$ to $W_2$ can be easily altered in the broad range.

What is claimed is:

1. An electrically heating reactor including
   (a) a reactor vessel,
   (b) an inlet opening in said reactor vessel for the introduction of raw material into the reactor vessel,
   (c) an outlet opening in said reactor vessel for the removal of heated material from the reactor vessel,
   (d) a heating means extending through said inlet opening and into the interior of said reactor vessel, said heating means including
      (1) an electrically conductive inner tube having an interior diameter large enough to permit the introduction of the material to be heated,
      (2) an electrically conductive outer tube that is arranged concentrically with respect to said inner tube and located at a spaced distance outwardly from the inner tube along most of its length except for the inwardlymost extending end portion,
      (3) an electrical insulating medium disposed in the space between said inner and outer tubes,
      (4) the innermost ends of said inner and outer tubes being electrically connected to each other by electrically conductive means sealing the space between said tubes from the interior of said reactor,
      (5) an alternating current source connected between the ends of said inner and outer tubes at a point where these tubes extend outside said reactor vessel,
      (6) said outer tube being made of ferromagnetic material and having a thickness greater than the depth to which the alternating current penetrates said outer tube, whereby the current is maintained within said outer tube and is prevented from entering said reactor vessel,
      (7) said outer tube being in direct contact with the wall of said reactor vessel at said inlet opening to form a seal therebetween,
   whereby when the alternating current source is energized current flows through the electrical circuit defined by said inner and outer tubes to generate heat, said current penetrating said outer tube to a depth depending upon the electrical and magnetic properties of said tube and the frequency of said alternating current course, the heat generated by said inner tube being imparted to the material flowing therethrough and the heat generated by said outer tube being imparted to the material exterior of said outer tube.

2. A reactor as defined in claim 1, wherein said alternating current source has a variable frequency.

3. A reactor as defined in claim 1, wherein said inner tube has a thickness greater than the depth to which the alternating current penetrates said inner tube.

4. A reactor as defined in claim 1 wherein said inner tube is formed of ferromagnetic material.

5. A reactor as defined in claim 1 wherein said outer tube is welded to said reactor vessel adjacent said inlet opening.

* * * * *